US009725338B2

United States Patent
Ranade et al.

(10) Patent No.: US 9,725,338 B2
(45) Date of Patent: *Aug. 8, 2017

(54) APPARATUS AND METHOD FOR REDUCTION IN AMMONIACAL NITROGEN FROM WASTE WATERS

(71) Applicant: Council of Scientific & Industrial Research, New Delhi (IN)

(72) Inventors: Vivek Vinayak Ranade, Maharashtra (IN); Amol Arvind Kulkarni, Maharashtra (IN); Vinay Manoharrao Bhandari, Maharashtra (IN)

(73) Assignee: Council of Scientific & Industrial Research, New Delhi (IN)

( * ) Notice: Subject to any disclaimer, the term of this patent is extended or adjusted under 35 U.S.C. 154(b) by 0 days.

This patent is subject to a terminal disclaimer.

(21) Appl. No.: 15/227,428

(22) Filed: Aug. 3, 2016

(65) Prior Publication Data

US 2016/0340211 A1    Nov. 24, 2016

Related U.S. Application Data

(63) Continuation-in-part of application No. 14/351,124, filed as application No. PCT/IN2012/000676 on Oct. 11, 2012, now Pat. No. 9,422,952.

(30) Foreign Application Priority Data

Oct. 11, 2011 (IN) .......................... 2918/DEL/2011
Feb. 14, 2012 (IN) .......................... 412/DEL/2012

(51) Int. Cl.
*C02F 1/72* (2006.01)
*C02F 1/34* (2006.01)
(Continued)

(52) U.S. Cl.
CPC .............. *C02F 1/34* (2013.01); *C02F 1/5281* (2013.01); *C02F 1/722* (2013.01); *F15C 1/16* (2013.01);
(Continued)

(58) Field of Classification Search
CPC ... B63J 1/00; B63J 4/002; C02F 1/006; C02F 1/36; C02F 2301/026; C02F 2103/008; C02F 2301/024; C02F 1/72
See application file for complete search history.

(56) References Cited

U.S. PATENT DOCUMENTS

| 4,259,988 A | 4/1981 | Singh |
| 5,042,998 A | 8/1991 | Beusen |
| 5,573,029 A | 11/1996 | Freimann |
| 6,402,820 B1 | 6/2002 | Tippetts et al. |

FOREIGN PATENT DOCUMENTS

| GB | 2 108 714 A | 5/1983 |
| GB | 2 391 959 A | 2/2004 |
| SU | 470 664 A1 | 5/1975 |
| WO | WO 2007/108012 A2 | 9/2007 |

OTHER PUBLICATIONS

International Search Report mailed by European Patent Office on Apr. 26, 2013 in the corresponding PCT Application No. PCT/IN2012/000676—3 pages.

*Primary Examiner* — Walter D Griffin
*Assistant Examiner* — Cameron Allen
(74) *Attorney, Agent, or Firm* — Knobbe, Martens, Olson & Bear, LLP (57) ABSTRACT

A method for treating effluent provides the effluent as an input to an apparatus having a vortex diode with aeration. The apparatus induces a cavitation assisted with aeration for the high rates of ammoniacal nitrogen in an orifice and the vortex diode with or without inserts/stabilizers to generate radicals, which reduce ammoniacal nitrogen of wastewater effectively during effluent treatments.

9 Claims, 6 Drawing Sheets (51) Int. Cl.

| | | |
|---|---|---|
| *F15C 1/16* | (2006.01) | |
| *F15D 1/00* | (2006.01) | |
| *C02F 3/28* | (2006.01) | |
| *C02F 1/74* | (2006.01) | |
| *C02F 1/42* | (2006.01) | |
| *C02F 1/52* | (2006.01) | |
| *C02F 1/28* | (2006.01) | |
| *C02F 101/16* | (2006.01) | |
| *C02F 103/34* | (2006.01) | |
| *C02F 103/32* | (2006.01) | |
| *C02F 1/78* | (2006.01) | |
| *C02F 3/02* | (2006.01) | |
| *C02F 101/30* | (2006.01) | |
| *C02F 103/28* | (2006.01) | |
| *C02F 103/30* | (2006.01) | |

(52) U.S. Cl.
CPC ............ *F15D 1/00* (2013.01); *F15D 1/0015* (2013.01); *C02F 1/28* (2013.01); *C02F 1/42* (2013.01); *C02F 1/5236* (2013.01); *C02F 1/725* (2013.01); *C02F 1/727* (2013.01); *C02F 1/74* (2013.01); *C02F 1/78* (2013.01); *C02F 3/02* (2013.01); *C02F 3/28* (2013.01); *C02F 2101/16* (2013.01); *C02F 2101/308* (2013.01); *C02F 2103/28* (2013.01); *C02F 2103/30* (2013.01); *C02F 2103/32* (2013.01); *C02F 2103/34* (2013.01); *C02F 2301/026* (2013.01); *C02F 2305/023* (2013.01); *C02F 2305/026* (2013.01); *Y02W 10/15* (2015.05)

APPARATUS AND METHOD FOR REDUCTION IN AMMONIACAL NITROGEN FROM WASTE WATERS

CROSS-REFERENCE TO RELATED APPLICATIONS

This application is a continuation in part of U.S. patent application Ser. No. 14/351,124, filed on Apr. 10, 2016, based on International Application No. PCT/IN2012/000676, which claims priority to Indian patent application No. 412/DEL/2012, filed on Feb. 14, 2012, and Indian patent application No. 2918/DEL/2011 with provisional specification filed on Oct. 11, 2011 and complete specification filed on Oct. 11, 2012, which are hereby incorporated by reference in their entirety.

FIELD OF THE INVENTION

The present invention relates to process intensification for reducing ammoniacal nitrogen from wastewaters in all types of cavitation reactors, such as orifice of different geometries and vortex diodes optionally with inserts as continuous flow reactors to induce cavitation to generate radicals for effluent treatment.

BACKGROUND OF THE INVENTION

Hydrodynamic cavitation reactors are devices for intense generation of cavitational events for fluid processing. These devices mostly are without any moving elements. Examples of these devices include, but are not limited to an orifice, venture, vortex diode, etc. More particularly, vortex diodes are among most useful fluidic devices, which do not have any moving elements. The basic design of a vortex diode consists of a disc-shaped chamber with a cylindrical axial port and at least one tangential port. Such devices have been modified over the years by many researchers and designers to improve their function as well as to use them for purposes other than as valves.

Effluents from various industries, such as chemical, distilleries, fisheries, and the like, have the issue of high ammoniacal nitrogen content in their wastewaters while the limit set by pollution control boards usually is around 50 mg/l for industrial wastewaters. Ammoniacal nitrogen commonly represents the amount of nitrogen compounds or pollutants, as ammonia in water. This is an important parameter in water analysis, especially, for wastewater treatment to protect environment.

Several chemical methods are known in the art for treating effluent to control ammoniacal nitrogen. Example of such chemical methods include, but are not limited to the biological methods of treatment and other physico-chemical methods, such as ion exchange, charge neutralizing species or coagulants. A few physical methods also exist for the treatment of wastewater, such as filtration, electro-oxidation, electro-coagulation, froth floatation, adsorption, etc. There are certain nitrogen containing organic pollutants, especially in wastewaters from industries such as dyes, pigments, colourants, distillery, etc. These nitrogen containing organic pollutants are considered refractory compounds, which are difficult to remove or degrade by using conventional methods of chemical or biological treatment. For such pollutants, newer techniques have to be explored, where extreme conditions can break down pollutants and nitrogen containing organic molecules.

Most of the existing wastewater treatment methodologies differ significantly from each other not just in their principles, but also in the form of application, process economics. Further, it has huge differences in land, equipment, and material requirements. Further, since effluent treatment is more complicated due to varied types of pollutants including organic and inorganic pollutants, new strategy is required involving novel materials, methods, and process integration options and technology for wastewater treatment.

Cavitation technology in recent years is found to be substantially beneficial in waste water treatment. Cavitation is a phenomenon of formation, growth, and collapse of micro bubbles within a fluid. Cavitation occurs due to increase in kinetic energy of the fluid at the expense of local pressure when the fluid passes through constriction. Hydrodynamic cavitation known in the art utilizes constriction such as orifice or venturi in the path of flow of fluid. Moreover, cavitation is realized due to linear velocity of fluid in conventional devices. Vortex diode disclosed in this invention on the other hand uses rotational flow to generate cavitation. The nature of cavities, more particularly, number density of generated cavities and intensity of collapse of generated cavities, in such rotational flows realized in vortex diode is significantly different than the other hydrodynamic cavitation devices known in the art as orifice or venturi, which are based on the constriction of flow.

Vortex diodes, which use cavitation and collapse of cavities generated due to rotational flows, have been hitherto unexplored for the treatment of effluents, more particularly, the effluents generated from highly polluting industries, such as distilleries, dye, pigments, and other colour effluent generating industries. The effluents generated from such highly polluting industries have high COD, ammoniacal nitrogen or colour have not been subjected to cavitation treatment for removal of ammoniacal nitrogen using process intensification by various types of cavitation devices.

Vortex diodes employ fluid vortex phenomena for its operation. The basic design of a vortex diode consists of a cylindrical axial port, a tangential port, and a chamber connecting the two ports. The chamber is characterized by its diameter and height, which decide the chamber volume. The flow entering the vortex diode through the tangential port sets up a vortex, and establishes a large pressure drop across the vortex diode.

U.S. Pat. No. 4,112,977 discloses a vortex diode wherein the tangential ports can be formed as push-fit into the main body of the vortex diode. It is recommended to have as many tangential ports as possible to improve flow symmetry and reduce pressure losses.

U.S. Pat. No. 6,358,415 discloses a sewage disposal apparatus, more particularly, a vortex sewage disposal apparatus for the disposal of sewage at construction sites.

The effective reduction in ammoniacal nitrogen from wastewaters is a serious challenge for existing treatment technologies. Therefore, there is need to develop an effective process for the reduction of nitrogen from effluents. The process intensification of this invention has not been reported earlier for reduction in ammoniacal nitrogen, especially, for all types of cavitation reactors.

SUMMARY OF THE INVENTION

The main object of present invention to provide a process for reducing ammoniacal nitrogen from effluents using cavitation reactors with aeration, wherein the process intensification can be carried in all types of cavitation reactors, such as orifice of different geometries and vortex diodes—optionally with inserts as continuous flow reactors to induce cavitation to generate radicals for effluent treatment.

One more object of present invention to provide an effluent treatment process for reducing COD (chemical oxygen demand) and ammoniacal nitrogen as well as colour using process intensified cavitation reactors.

In accordance with the purposes of the invention, the present invention as embodied and broadly described herein, provides a method and apparatus for treating effluent.

Figure 1:
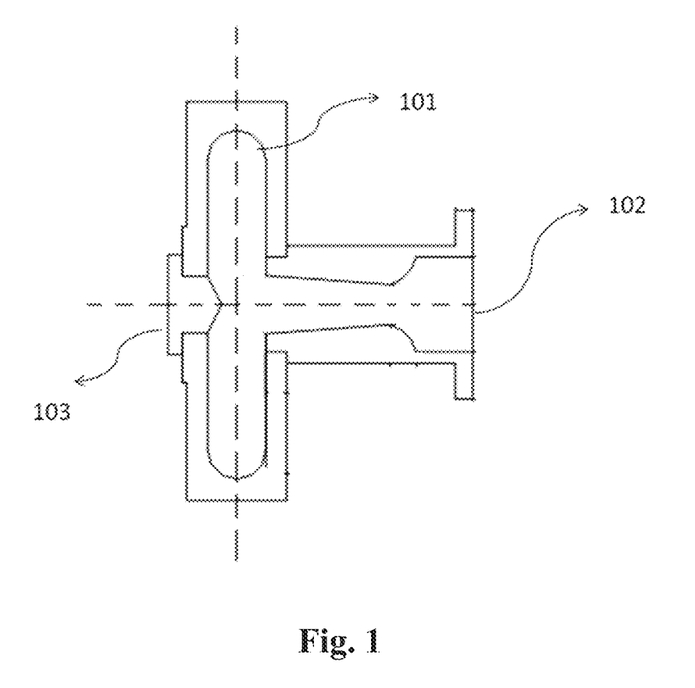
FIG. 1: Vortex diode with chamber (101), axial outlet port (102), and insert (103).
Figure 2:
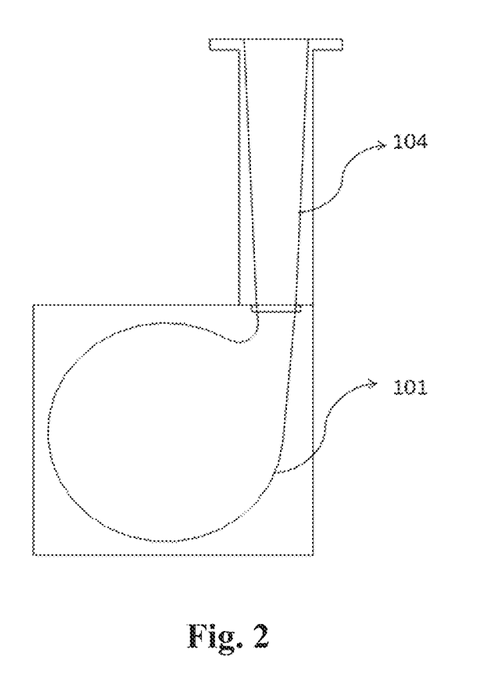
FIG. 2: Vortex diode with chamber (101) and tangential inlet port (104).
Figure 3:
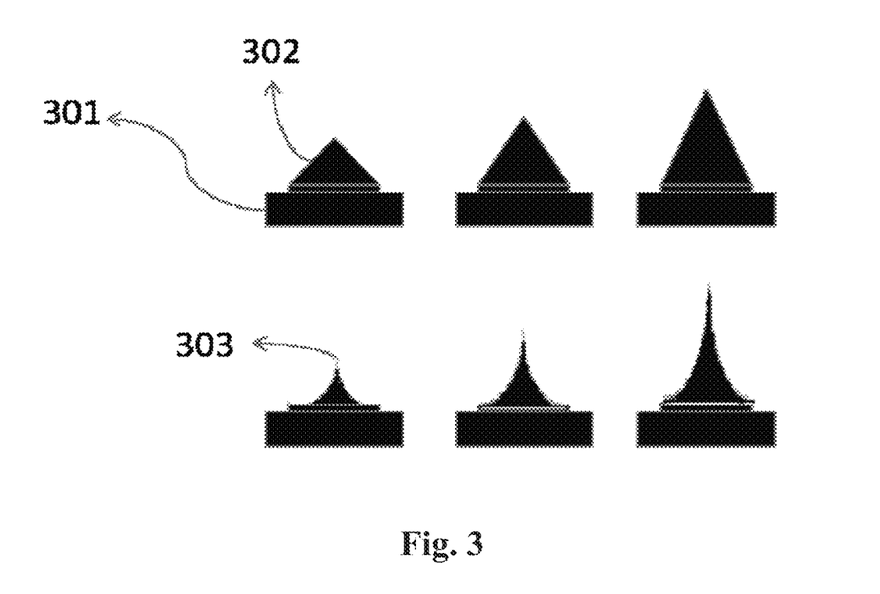
FIG. 3: Inserts for diode chamber, more particularly, insert base (301) with or without threads, conical insert (302) with said base (301), and hyperbolic conical insert (303) with said base (301).
Figure 4:
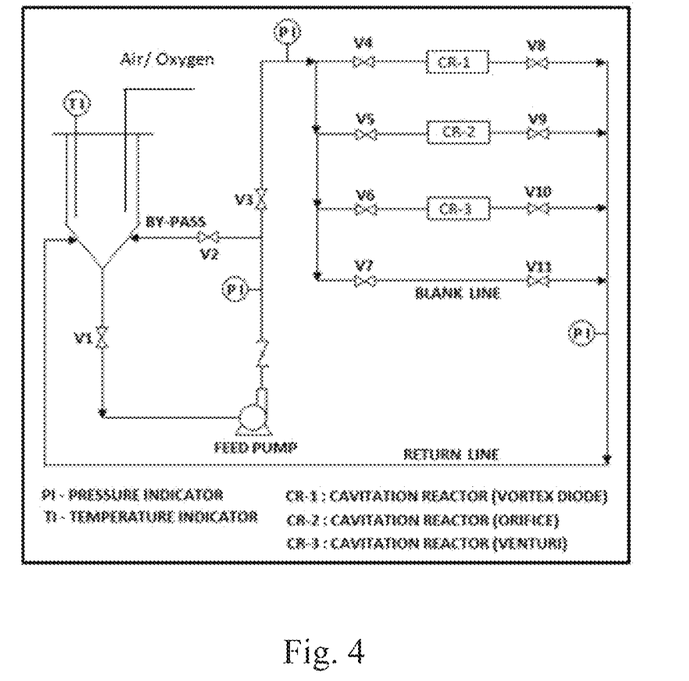
FIG. 4: Experimental setup for process intensification in hydrodynamic cavitation.

In one embodiment, said method comprises the step of providing the effluent as input to an apparatus comprising a vortex diode with aeration. Said vortex diode comprises a chamber (101) provided with at least one inlet as a tangential port (104), wherein a flow entering from the tangential port sets up a high resistance mode of operation; a vortex stabilizer (103) connected to the chamber (101), wherein said vortex stabilizer comprises a base (301) with or without threads (401) and an insert (402, 403) which lies within the chamber (101), the insert being symmetrical around axis of an axial port (102) having a geometrical shape formable by revolving either a straight connecting line having slope or a curved line between a point on the axis and a point lying on the base (301) opposite to the axial port (102); and the axial port (102) provided in the chamber (101) for discharging treated effluent water, characterized in that the vortex stabilizer (103) having a diameter in a range of 10 to 40% of a diameter of the chamber and having a height less than 15% of the diameter of the chamber such that the process enhances the reduction of the ammoniacal nitrogen content of the effluent.

In another embodiment, an apparatus for treating effluent comprises a vortex diode with aeration. Said vortex diode further comprises: a chamber (101) provided with at least one inlet as a tangential port (104), wherein a flow entering from the tangential port sets up a high resistance mode of operation; a vortex stabilizer (103) connected to the chamber (101), wherein said vortex stabilizer comprises a base (301) with or without threads (401) and an insert (402, 403) which lies within the chamber (101), the insert being symmetrical around axis of an axial port (102) having a geometrical shape formable by revolving either a straight connecting line having slope or a curved line between a point on the axis and a point lying on the base (301) opposite to the axial port (102); and the axial port (102) provided in the chamber (101) for discharging treated effluent water, characterized in that the vortex stabilizer (103) having a diameter in a range of 10 to 40% of a diameter of the chamber and having a height less than 15% of the diameter of the chamber such that the process enhances the reduction of the ammoniacal nitrogen content of the effluent.

In a further embodiment, the vortex diode described herein is used in combination with at least one of ion exchange, alum treatment, Fenton, electro-Fenton, photo-Fenton, $H_2O_2$, Ozone, $Cl_2$, $ClO_2$, and anaerobic or aerobic biological oxidation.

In a further embodiment, the method for treatment enhances gas yield of anaerobic digestion.

In a further embodiment, the effluent for treatment and reduction of ammoniacal nitrogen comprises at least one of industrial waste, domestic waste, chemical waste, paper industry waste, distilleries waste, textile waste, or dyeing industries waste.

In a further embodiment, the aeration may be carried out with pure oxygen, air, or any such gas.

In a further embodiment, the vortex diode used for the treatment may optionally be replaced with an orifice for the treatment of the effluent.

DETAILED DESCRIPTION OF THE INVENTION

For the purpose of this document: "Enhanced reduction of the ammoniacal nitrogen content of the effluent" means the ammoniacal nitrogen is reduced by greater than 10% in comparison with that reduced without aeration.

The invention will now be described in detail in connection with certain preferred and optional embodiments, so that various aspects thereof may be more fully understood and appreciated.

In an embodiment, the present invention provides a process for reducing ammoniacal nitrogen, COD (chemical oxygen demand) and colour from effluents using cavitation reactor of any type with aeration, optionally, with insert or vortex stabilizers.

In a preferred embodiment, process intensification for reducing ammoniacal nitrogen COD (chemical oxygen demand) and colour from effluents using a cavitation reactor, such as a vortex diode that comprises an insert or vortex stabilizer placed in a chamber on a surface opposite to an axial port in the chamber.

In another embodiment, the present invention provides improvement in the form of process intensification due to addition of air, oxygen, etc. The process intensification is used in the form of aeration either air or oxygen and using cavitation reactors, such as orifice and vortex diode that comprises an insert or vortex stabilizer placed in a chamber on a surface opposite to an axial port in the chamber. The inserts or vortex stabilizer in the vortex diode have specific shapes and the shape characteristics of the inserts are described herein.

The inserts disclosed in this invention induce strong vortex in the vortex chamber; stabilize the vortical flow in the vortex diode; and manipulate nature of cavitation, such as number density of generated cavities and intensity of cavity collapse, for effective effluent treatment.

The present invention allows significant increase in the reactor efficiency in practically all types of hydrodynamic cavitation reactors, such as orifice, Vortex diodes, etc.

The orifice in the present invention operates with axial outlet port, which is an aperture of appropriate size to provide high resistance and pressure drop and axial discharge of treated effluent.

The vortex diode of the present invention operates with the tangential port as the inlet thereby setting up a high resistance mode of operation and an axial port as the outlet to discharge treated effluent water.

In the present invention, cavitation is realized by both rotational (vortical) flow and increasing linear velocity of liquid, as done in conventional devices. The number density as well as intensity of cavitation is significantly different in present vortex diode, than the conventional cavitation devices because of the radically different flow patterns and pressure history experienced by cavities generated in the vortex diode.

The invention employs process for reducing ammoniacal nitrogen from waste waters cavitation reactors, such as orifice and vortex-induced cavitation in the vortex diode optionally with inserts or stabilizers for generating radicals for expediting reactions and wastewater treatment. Further, stabilization of the vortex diode and enhanced cavitation, which has beneficial impact on reactions and waste water treatment, is achieved by modifying the chamber design of the vortex diode externally without dismantling the diode and using different flow rates.

The cavitation reactors give reduction in effluent parameters across wide range of pressure drops and other process parameters, such as flow rates and temperature. These process parameters may be standardized according to the scale of cavitation device and the type of effluent.

The reduction in ammoniacal nitrogen is observed in the range of up to 80%. There is drastic increase in the extent of removal of ammoniacal nitrogen and that too is applicable to any cavitating device.

While the process is described in preferred embodiments, the process parameters may vary with regard to the dimensions of cavitation reactors. The flow rates and time of residence may vary depending on rate of reaction. The inlet water may be recycled to achieve effluent parameters.

The effluent water may be pretreated or the water collected after passing through the cavitating device may further be subjected to chemical or biological treatments known in the art.

Accordingly, the effluent is pumped into an inlet with a high pressure pump capable of pumping the effluent water through a loop with the flow rate of up to 1000 liter per hour. The nominal pipe diameter of the loop is about ¾ inch. The storage tank of 50 liters is used to store and treat the effluent water. An arrangement is provided for aeration in the tank for bubbling air or oxygen as a process intensification of the conventional process. The effluent with high ammoniacal nitrogen value, depending on the type of pollutant, is treated in the disclosed cavitation device based on orifice or vortex diode with insert or vortex stabilizer. The loop is operated with the flow rate of up to 900 liter/hour for about 60 to 180 minutes. After that, the sample from the storage tank is tested for ammoniacal nitrogen and/or COD.

In yet another embodiment of the invention, the cavitation reactor with process intensification is used for treatment of effluents for control of parameters selected from ammoniacal nitrogen, pH, colour, odour, COD, and BOD. The process is easy to operate and control. The process can work effectively for a number of industrial wastewaters and with variety of pollutants. The level of treatment is such that not just reduction in ammoniacal nitrogen to the extent of order of magnitude is accomplished, but the reclaimed water can also be recycled or reused with or without further treatment. The invention can also help in reduction of colour of the effluent. The invention effectively controls the reduction in ammoniacal nitrogen and/or colour from the effluent waters with the suitable adjustment of processing parameters and/or design modification in the cavitation devices. Further, the process intensified cavitating devices can effectively be used for treating effluents for domestic use or industrial use in industries such as chemical, paper, distilleries, textile, dyeing industries, and the like.

The cavitating devices and process intensification may be used alone or in combinations with effluent treatment processes selected from, but not limited to: ion exchange, alum treatment, coagulant, Fenton, electro-Fenton, biological treatment, ozone based treatments, hydrogen peroxide based treatments, chlorine based treatments, chlorine dioxide based treatments, etc. In a preferred embodiment of the invention, the process of effluent treatment is carried out with pressure drops ranging from 0.1-2 bar; though pressure drop may depend on the scale of operation.

The experimental loop for effluent treatment with the disclosed invention can be used with other conventional as well as modified separation processes, such as adsorption. In the adsorption process, physico-chemical adsorption of nitrogen containing organics can take place on the surface of adsorbent, thereby effecting removal of pollutants and ammoniacal nitrogen from the wastewaters. The disclosed invention can be used in combination with the adsorption process either adsorption occurring prior to passing through the disclosed invention process or after the effluent is passed through the disclosed invention loop. The extent of removal of ammoniacal nitrogen depends on the aeration rate, the nature of process intensification, the number of passes through the cavitating device. Here, the number of passes through the adsorption column can be limited from once to more than once. Further, a series of adsorption operations can also be employed for simultaneous reduction in the COD, ammoniacal nitrogen, and removal of colour of the effluent. Apart from these, the process parameters, such as pH of the solution and temperature, also affect the performance. The temperature effect with the disclosed invention can be exploited to derive maximum benefit in combined adsorption-cavitation process using the disclosed invention.

The experimental loop for effluent treatment with the disclosed invention can be used with other conventional as well as modified separation processes, such as Ion Exchange. In the Ion Exchange process, removal of organics-ionic in nature can take place on the surface of the resin-natural or synthetic, such as polymeric ion exchange resins, thereby effecting the removal of pollutants contributing to ammoniacal nitrogen from the wastewaters. The disclosed invention can be used in combination with the ion exchange process either ion exchange occurring prior to passing through the disclosed invention process or after the effluent is passed through the disclosed invention loop. The extent of removal of ammoniacal nitrogen depends on the number of passes through the disclosed invention device, while the number of passes through the ion exchange column can be limited from once to more than once. Further, a series of ion exchange operation can also be employed for simultaneous reduction in the COD, ammoniacal nitrogen, and removal of colour of the effluent. A combination of different types of resins, such as anion and cation exchange resins and weak base resins can be very useful for increasing the effectiveness of the effluent treatment operation.

The experimental loop for effluent treatment with the disclosed invention can be used with other conventional as well as modified separation processes, such as coagulation. Coagulation is a process in which destabilization of colloidal particles present in the solution is achieved by addition of salts, which reduce or neutralize or invert the electrical repulsion between particles. The addition of appropriate coagulant that may be organic or inorganic can be effected in combination with the loop housing the disclosed invention device. The point of addition can be varied and can be before, after the cavitation device or it can be injected directly in the cavitation zone using appropriate methodology. The disclosed invention can be used in combination with the coagulation process either coagulation occurring prior to passing through the disclosed invention process, in the cavitation zone or after the effluent is passed through the disclosed invention loop. The extent of removal of ammoniacal nitrogen or COD would depend on the number of passes through the disclosed invention device. Further, the two operations can be in a series for simultaneous reduction in the COD, ammoniacal nitrogen, and the removal of colour of the effluent. Apart from these, the process parameters, such as pH of the solution and temperature, also affect the performance. The temperature effect observed with the cavitation can also be exploited to derive the maximum benefit of a combined coagulation-cavitation process using the disclosed invention.

The experimental loop for effluent treatment with the disclosed invention can be used with other reaction processes, such as conventional oxidation processes. Fenton and photo-Fenton oxidation processes have been generally reported in wastewater treatment. In the Fenton oxidation process, the use of oxidation reagent, such as hydrogen peroxide is employed with iron based catalyst. The use of other oxidizing reagents has also been reported. In the disclosed invention process, there is generation of hydrogen peroxide and OH radical, which assist in the degradation of the pollutants in the effluent. In addition to this mechanism, a separate oxidation step combining different oxidizing agents along with the disclosed invention device can be employed in order to achieve maximum removal, and hence most efficient process performance for COD and/or ammoniacal nitrogen removal. To accomplish this, the disclosed invention can be used in combination with the oxidation process either oxidation occurring prior to passing through the disclosed invention device, in the cavitation zone or after the effluent is passed through the disclosed invention loop. The extent of removal of ammoniacal nitrogen and/or COD would depend on the number of passes through the disclosed invention device. Further, a series operation can also be employed for simultaneous reduction in the COD, ammoniacal nitrogen, and the removal of colour of the effluent. Apart from these, the process parameters, such as pH of the solution and temperature, also affect the performance. The temperature effect observed with the cavitation can also be exploited to derive maximum benefit of a combined oxidation-cavitation process using the disclosed invention.

A person skilled in the art may appreciate the versatility and flexibility in reconfiguration and construction in various applications as required.

Advantages of the Invention

The invention provides effective reduction in ammoniacal nitrogen from wastewaters which help in water recycle and reuse apart from reaching prescribed norms for ammoniacal nitrogen in the discharged waters.

The present invention used for improving efficiency of reactors that can generate cavitation, such as a strong vortex in the vortex chamber, which significantly enhances rate of reactions and effectiveness of waste water treatment for reducing ammoniacal nitrogen through process intensification.

The following examples, which include preferred embodiments, will serve to illustrate the practice of this invention, it being understood that the particulars shown are by way of example only and for the purpose of illustrative discussion of preferred embodiments of the invention.

EXAMPLE

Example: 1

The experimental set-up consisted an effluent storage tank, a pump and set of cavitation reactors, such as orifice vortex diode. An arrangement in the form of air pump or air cylinder, oxygen cylinder or any gas bubbling was made as a part of process intensification to this experimental set-up. The nominal pipe diameter used was ¾ inch. The set-up was equipped with pump capable of providing 1000 liters per hour flow through the section. A storage tank of 50 liters was used for the effluent storage. A synthetic wastewater solution containing 4-amino phenol was used for the treatment. Air was sparged through the effluent. Using different conditions for the pressure drop through the cavitating device under process intensification, a reduction of ~69% and ~66% was obtained in the ammoniacal nitrogen for initial concentration of ~200 ppm for vortex diode at pressure drop of 0.5 bar and 2 bar respectively as against ~26% only without aeration. There is significant variation in the percentage ammoniacal nitrogen and/or COD reduction with the pressure drop and with time as observed in Table 1 using the disclosed invention process. While the process intensification in the form of aeration is effective for reduction in ammoniacal nitrogen, it was observed that there was not much increase in % COD removed. Also, there is significant difference in terms of time of processing and in different pressure conditions.

TABLE 1

AMONIACAL NITROGEN REDUCTION WITH AND WITHOUT AERATION USING VORTEX DIODE

| | | Without Aeration | | With Aeration | |
| --- | --- | --- | --- | --- | --- |
| Sr. No. | Time (min) | % COD Removal | % NH4-N Removal | % COD Removal | % NH4-N Removal |
| Compound: 4-aminophenol Concentration: 200 ppm Volume: 20 Lit. Reactor: Vortex Diode Pressure drop: 0.5 bar | | | | | |
| 1 | 0 | 0 | 0 | 0 | 0 |
| 2 | 30 | 2.88 | 11.52 | 3.47 | 34.01 |
| 3 | 60 | 5.18 | 17.58 | 12.72 | 55.88 |
| 4 | 90 | 10.92 | 24.85 | 17.35 | 68.43 |
| 5 | 120 | 13.22 | 26.67 | 22.55 | 69.24 |
| Pressure drop: 2 Bar | | | | | |
| 1 | 0 | 0 | 0 | 0 | 0 |
| 2 | 30 | 2.33 | 16.22 | 5.92 | 42.92 |
| 3 | 60 | 2.91 | 21.63 | 7.11 | 63.1 |
| 4 | 90 | 6.4 | 24.33 | 20.72 | 64.81 |
| 5 | 120 | 7.56 | 25.68 | 23.08 | 65.67 |

Example: 2

Experimental loop for effluent treatment with disclosed invention was established. The nominal pipe diameter used was ¾ inch. The set-up was equipped with pump capable of providing 1000 liters per hour flow through the section. A storage tank of 50 liters was used for the effluent storage. A synthetic wastewater solution containing 4-amino phenol was used for the treatment. Air was sparged through the effluent. Using different conditions for the pressure drop through the cavitating device under process intensification, a reduction of ~66% and ~62% was obtained in the ammoniacal nitrogen for initial concentration of ~200 ppm for Orifice at pressure drop of 2.0 bar and 5 bar respectively as against that of only ~22% without aeration. There is significant variation in the percentage ammoniacal nitrogen and COD reduction with the pressure drop and with time as observed in Table 2 using the disclosed invention process. While the process intensification in the form of aeration is effective for reduction in ammoniacal nitrogen, almost double than without aeration in orifice; it was observed that there was not much impact on % COD removed. Also, there is significant difference in terms of time of processing and in different pressure conditions.

TABLE 2

AMONIACAL NITROGEN REDUCTION WITH AND WITHOUT AERATION USING ORIFICE

| | | Without Aeration | | With Aeration | |
|---|---|---|---|---|---|
| Sr. No. | Time (min) | % COD Removal | % NH4-N Removal | % COD Removal | % NH4-N Removal |
| Compound: 4-aminophenol | | | | | |
| Concentration: 200 ppm | | | | | |
| Volume: 20 Lit. | | | | | |
| Reactor: Orifice | | | | | |
| Pressure drop: 2 bar | | | | | |
| 1 | 0 | 0 | 0 | 0 | 0 |
| 2 | 30 | 1.21 | 12.5 | 7.57 | 34.33 |
| 3 | 60 | 7.84 | 16.5 | 11.9 | 55.51 |
| 4 | 90 | 8.44 | 19.5 | 18.38 | 65.68 |
| 5 | 120 | 9.64 | 21 | 21.63 | 66.11 |
| Pressure drop: 5 bar | | | | | |
| 1 | 0 | 0 | 0 | 0 | 0 |
| 2 | 30 | 3.95 | 9.87 | 9.95 | 35.56 |
| 3 | 60 | 6.78 | 13.01 | 13.26 | 53.34 |
| 4 | 90 | 7.34 | 14.35 | 23.76 | 61.78 |
| 5 | 120 | 9.4 | 21.98 | 24.87 | 62.23 |

Example: 3

Experimental loop for effluent treatment with disclosed invention was established. The nominal pipe diameter used was ¾". The set-up was equipped with pump capable of providing 1000 LPH flow through the section. A storage tank of 50 liters was used for the effluent storage. A synthetic wastewater solution containing 4-amino phenol of higher concentration than previous examples was used for the treatment. Air was sparged through the effluent. Using different conditions for the pressure drop through the cavitating device under process intensification, a very high reduction of ~75% and ~77% was obtained in the ammoniacal nitrogen for initial concentration of ~500 ppm for vortex diode at pressure drop of 0.5 bar and 2 bar respectively as against less than 20% without aeration. There is significant variation in the percentage ammoniacal nitrogen/COD reduction with the pressure drop and with time as observed in Table 3 using the disclosed invention process. While the process intensification in the form of aeration is effective for reduction in ammoniacal nitrogen, it was observed that there was not much increase in % COD removed. Also, there is significant difference in terms of time of processing and in different pressure conditions.

TABLE 3

AMONIACAL NITROGEN REDUCTION WITH AND WITHOUT AERATION USING VORTEX DIODE

| | | Without Aeration | | With Aeration | |
|---|---|---|---|---|---|
| Sr. No. | Time (min) | % COD Removal | % NH4-N Removal | % COD Removal | % NH4-N Removal |
| Compound: 4-aminophenol | | | | | |
| Concentration: 500 ppm | | | | | |
| Volume: 20 Lit. | | | | | |
| Reactor: Vortex Diode | | | | | |
| Pressure drop: 0.5 bar | | | | | |
| 1 | 0 | 0 | 0 | 0 | 0 |
| 2 | 30 | 8.6 | 15.73 | 13.66 | 44.65 |
| 3 | 60 | 8.72 | 17.02 | 16.18 | 63.76 |
| 4 | 90 | 3.15 | 17.18 | 21.22 | 74.96 |
| 5 | 120 | 5.82 | 18.97 | 24.16 | 74.96 |
| Pressure drop: 2 bar | | | | | |
| 1 | 0 | 0 | 0 | 0 | 0 |
| 2 | 30 | 1.27 | 10.02 | 5.09 | 38.09 |
| 3 | 60 | 4.66 | 12.64 | 8.55 | 61.52 |
| 4 | 90 | 0.43 | 13.41 | 9.24 | 75.21 |
| 5 | 120 | 3.18 | 13.72 | 16.63 | 77.14 |

Example: 4

Experimental loop for effluent treatment with disclosed invention was established. The nominal pipe diameter used was ¾". The set-up was equipped with pump capable of providing 1000 LPH flow through the section. A storage tank of 50 liters was used for the effluent storage. A synthetic wastewater solution containing 4-amino phenol was used for the treatment. Air was sparged through the effluent. Using different conditions for the pressure drop through the cavitating device under process intensification, a reduction of ~66% and ~62% was obtained in the ammoniacal nitrogen for initial concentration of ~200 ppm for Orifice at pressure drop of 2.0 bar and 5 bar respectively as against that of only ~22% without aeration. There is significant variation in the percentage ammoniacal nitrogen and COD reduction with the pressure drop and with time as observed in Table 4 using the disclosed invention process. While the process intensification in the form of aeration is effective for reduction in ammoniacal nitrogen, (almost double than without aeration in Orifice),it was observed that there was not much impact on % COD removed. Also, there is significant difference in terms of time of processing and in different pressure conditions.

TABLE 4

AMONIACAL NITROGEN REDUCTION WITH AND WITHOUT AERATION USING ORIFICE

| | | Without Aeration | | With Aeration | |
|---|---|---|---|---|---|
| Sr. No. | Time (min) | % COD Removal | % NH4-N Removal | % COD Removal | % NH4-N Removal |
| Compound: 4-aminophenol | | | | | |
| Concentration: 500 ppm | | | | | |
| Volume: 20 Lit. | | | | | |
| Reactor: Orifice | | | | | |
| Pressure drop: 2 bar | | | | | |
| 1 | 0 | 0 | 0 | 0 | 0 |
| 2 | 30 | 10.14 | 7.98 | 3.51 | 35.8 |
| 3 | 60 | 8.82 | 8.84 | 6.78 | 57.48 |

TABLE 4-continued

AMONIACAL NITROGEN REDUCTION WITH AND
WITHOUT AERATION USING ORIFICE

| | | Without Aeration | | With Aeration | |
|---|---|---|---|---|---|
| Sr. No. | Time (min) | % COD Removal | % NH4-N Removal | % COD Removal | % NH4-N Removal |
| 4 | 90 | 8.15 | 10.22 | 14.26 | 70.26 |
| 5 | 120 | 7.71 | 8.67 | 16.59 | 74.63 |
| | | Pressure drop: 5 bar | | | |
| 1 | 0 | 0 | 0 | 0 | 0 |
| 2 | 30 | 4.63 | 10.08 | 5 | 35.48 |
| 3 | 60 | 7.71 | 13.39 | 11.67 | 56.93 |
| 4 | 90 | 7.93 | 14.49 | 15 | 71.12 |
| 5 | 120 | 9.92 | 13.71 | 19.77 | 79.9 |

Example: 5

Experimental loop for effluent treatment with disclosed invention was established. The nominal pipe diameter used was ¾". The set-up was equipped with pump capable of providing 1000 LPH flow through the section. A storage tank of 50 liters was used for the effluent storage. A synthetic wastewater solution containing 4-amino phenol was used for the treatment. Oxygen was sparged through the effluent. Using different conditions for the pressure drop through the cavitating devices under process intensification, a reduction close to 78% was obtained in the ammoniacal nitrogen for initial concentration of ~500 ppm for both Vortex Diode and Orifice as against that of only ~14% without aeration. The results are given in Table 5. The percentage reduction in both type of cavitating devices is almost similar in nature indicating that process intensification is useful in all types of cavitating devices and for significantly increasing reduction in ammoniacal nitrogen from wastewaters.

To illustrate the impact of process intensification, a different, inert gas-Helium was sparged through the effluent. Here, a reduction of max. 14% was obtained in the ammoniacal nitrogen for initial concentration of ~500 ppm for both Vortex Diode and Orifice as against that of only ~14% without aeration. The results are given in Table 5. The practically no effect of inert gas clearly indicates that process intensification of present invention is useful in all types of cavitating devices and for significantly increasing reduction in ammoniacal nitrogen from wastewaters.

Figure 5:
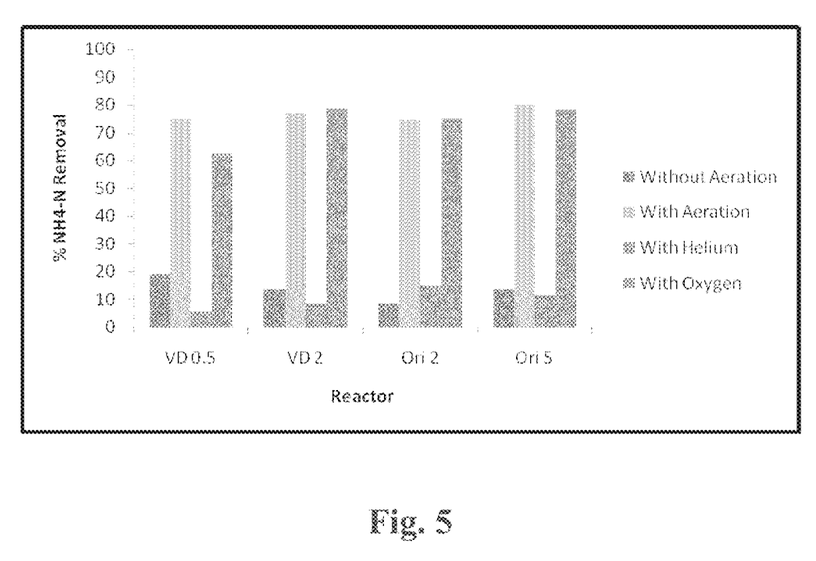
FIG. 5: Comparison chart for reduction in ammoniacal nitrogen under different conditions of process intensification.
Figure 6:
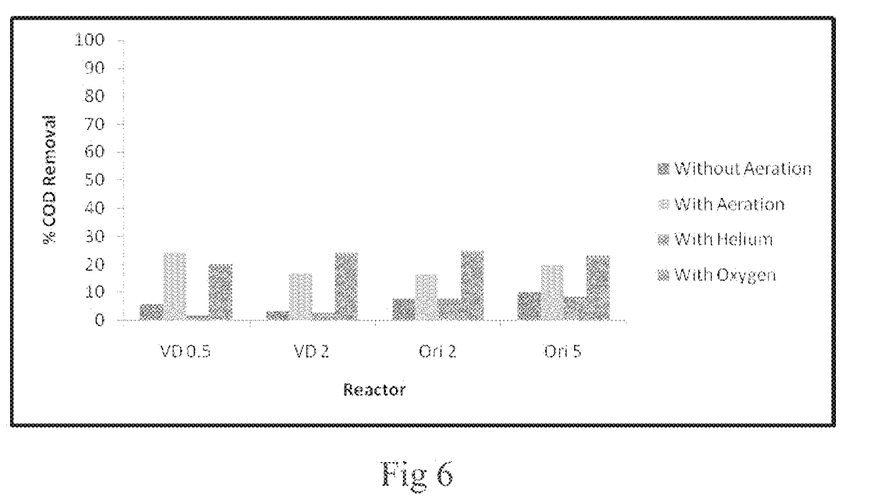
FIG. 6: Comparison chart for reduction in COD under different conditions of process intensification.

The results showing the comparison in ammoniacal nitrogen reduction under different conditions are presented in FIG. 5 for different cavitating devices and using different pressure conditions. While the process intensification in the form of aeration or oxygen addition is effective for reduction in ammoniacal nitrogen, it can be seen that there was not much impact when inert gas is used. Also, such enhancement is not seen in COD reduction (FIG. 6).

TABLE 5

AMONIACAL NITROGEN REDUCTION WITH AND WITHOUT
AERATION USING ORIFICE
Compound = 4-amino phenol (500 ppm)

| | | Pressure | % Removal of $NH_4$—N after 120 min | | | |
|---|---|---|---|---|---|---|
| Sr. No. | Reactor | drop (bar) | Without Aeration | With Aeration | With Helium | With Oxygen |
| 1 | Vortex Diode | VD 0.5 | 18.97 | 74.96 | 5.52 | 62.49 |
| 2 | Vortex Diode | VD 2 | 13.72 | 77.14 | 8.5 | 78.69 |
| 3 | Orifice | Ori 2 | 8.67 | 74.63 | 14.93 | 75.05 |
| 4 | Orifice | Ori 5 | 13.71 | 79.9 | 11.63 | 78.5 |

Example: 6

The disclosed invention was tested in a distillery spent wash treatment unit. Appropriately sized vortex diode based device was installed at a day tank storing the distillery spent wash for subsequent feeding to anaerobic digester. The distillery spent wash was circulated through the diode in a pipe loop (with nominal pipe diameter 2 inch) with a flow rate in the range of approximately 18 m³/hr. The diode was operated continuously for several hours. The treated spent wash was fed to the existing anaerobic digester which showed significantly higher (>13%) gas yield for the spent wash treated with the diode.

TABLE 6

| Sr. No | Time (min) | COD (ppm) | % Reduction |
|---|---|---|---|
| 1 | 0 | 67250 | — |
| 2 | 10 | 58350 | 13 |
| 3 | 20 | 55200 | 18 |
| 4 | 30 | 54350 | 19 |
| 5 | 40 | 52900 | 21 |
| 6 | 55 | 48450 | 28 |

While certain present preferred embodiments of the invention have been illustrated and described herein, it is to be understood that the invention is not limited thereto. Clearly, the invention may be otherwise variously embodied, and practiced within the scope of the following claims.

What is claimed is:

1. A method for treating effluent by providing the effluent as an input to an apparatus comprising a vortex diode with aeration, said vortex diode comprising:
   i. a chamber provided with at least one inlet as a tangential port, wherein a flow entering from the tangential port sets up a resistance mode of an operation;
   ii. a vortex stabilizer connected to the chamber, wherein said vortex stabilizer comprises a base with or without threads and an insert which lies within the chamber, the insert being symmetrical around an axis of an axial port having a geometrical shape formable by revolving either a straight connecting line having slope or a curved line between a point on the axis and a point lying on the base opposite to the axial port; and
   iii. the axial port provided in the chamber for discharging treated effluent water,
   wherein the vortex stabilizer has a diameter in a range of 10 to 40% of a diameter of the chamber and has a height less than 15% of the diameter of the chamber such that the method enhances reduction of an ammoniacal nitrogen content of the effluent.

2. The method according to claim 1, wherein said vortex diode is used in combination with at least one selected from the group consisting of ion exchange, alum treatment, Fenton, electro-Fenton, photo-Fenton, $H_2O_2$, Ozone, $Cl_2$, $ClO_2$, and anaerobic or aerobic biological oxidation.

3. The method according to claim 1, wherein said treatment enhances gas yield of anaerobic digestion.

4. The method according to claim 1, wherein the effluent comprises at least one selected from the group consisting of industrial waste, domestic waste, chemical waste, paper industry waste, distilleries waste, textile waste, and dyeing industries waste.

5. The method according to claim 1, wherein the aeration is carried out with air or oxygen.

6. An apparatus for treating effluent, said apparatus comprising a vortex diode with aeration, said vortex diode comprises:
   i. a chamber provided with at least one inlet as a tangential port, wherein a flow entering from the tangential port sets up a resistance mode of an operation;
   ii. a vortex stabilizer connected to the chamber, wherein said vortex stabilizer comprises a base with or without threads and an insert which lies within the chamber, the insert being symmetrical around an axis of an axial port having a geometrical shape formable by revolving either a straight connecting line having slope or a Curved line between a point on the axis and a point lying on the base opposite to the axial port; and
   iii. the axial port provided in the chamber for discharging treated effluent water,
   wherein the vortex stabilizer has a diameter in a range of 10 to 40% of a diameter of the chamber and has a height less than 15% of the diameter of the chamber such that the apparatus enhances reduction of an ammoniacal nitrogen content of the effluent.

7. The apparatus according to claim 6, wherein said vortex diode is used in combination with at least one selected from the group consisting of ion exchange, alum treatment, Fenton, electro-Fenton, photo-Fenton, $H_2O_2$, Ozone, $Cl_2$, $ClO_2$, and anaerobic or aerobic biological oxidation.

8. The apparatus according to claim 6, wherein the effluent comprises at least one selected from the group consisting of industrial waste, domestic waste, chemical waste, paper industry waste, distilleries waste, textile waste, and dyeing industries waste.

9. The apparatus according to claim 6, wherein the aeration is carried out with air or oxygen.

\* \* \* \* \*

UNITED STATES PATENT AND TRADEMARK OFFICE
CERTIFICATE OF CORRECTION

PATENT NO. : 9,725,338 B2  
APPLICATION NO. : 15/227428  
DATED : August 8, 2017  
INVENTOR(S) : Vivek Vinayak Ranade et al.

It is certified that error appears in the above-identified patent and that said Letters Patent is hereby corrected as shown below:

In the Specification

In Column 1 at Line 9 (approx.), Change "2016," to --2014,--.

In Column 8 at Line 32 (approx.), Change "AMONIACAL" to --AMMONIACAL--.

In Column 9 at Line 15 (approx.), Change "AMONIACAL" to --AMMONIACAL--.

In Column 10 at Line 3 (approx.), Change "AMONIACAL" to --AMMONIACAL--.

In Column 10 at Line 47 (approx.), Change "Orifice),it" to --Orifice), it--.

In Column 10 at Line 53 (approx.), Change "AMONIACAL" to --AMMONIACAL--.

In Column 11 at Line 3 (approx.), Change "AMONIACAL" to --AMMONIACAL--.

In Column 11 at Line 57 (approx.), Change "AMONIACAL" to --AMMONIACAL--.

In Column 12 at Line 3 (approx.), Change "AMONIACAL" to --AMMONIACAL--.

In the Claims

In Column 14 at Line 3, In Claim 6, change "Curved" to --curved--.

Signed and Sealed this  
Twenty-seventh Day of March, 2018

Andrei Iancu  
*Director of the United States Patent and Trademark Office*